US012215828B2

(12) United States Patent
Dvorak

(10) Patent No.: US 12,215,828 B2
(45) Date of Patent: Feb. 4, 2025

(54) APPARATUS AND METHOD FOR FILLING A GAS MAGAZINE OF A PNEUMATIC WEAPON SIMULATOR

(71) Applicant: Vojtech Dvorak, Tulsa, OK (US)

(72) Inventor: Vojtech Dvorak, Tulsa, OK (US)

( * ) Notice: Subject to any disclaimer, the term of this patent is extended or adjusted under 35 U.S.C. 154(b) by 0 days.

(21) Appl. No.: 17/195,637

(22) Filed: Mar. 8, 2021

(65) Prior Publication Data

US 2021/0348720 A1 Nov. 11, 2021

Related U.S. Application Data

(60) Provisional application No. 62/986,596, filed on Mar. 6, 2020.

(51) Int. Cl.

*F17C 5/00* (2006.01)
*F17C 13/04* (2006.01)
*F41A 33/06* (2006.01)

(52) U.S. Cl.

CPC ................ *F17C 5/00* (2013.01); *F17C 13/04* (2013.01); *F41A 33/06* (2013.01); *F17C 2205/0335* (2013.01); *F17C 2270/05* (2013.01)

(58) Field of Classification Search

CPC .... F17C 5/00; F17C 13/04; F17C 2205/0335; F17C 2270/05; F41A 33/06
USPC ............................................................ 141/1
See application file for complete search history.

(56) References Cited

U.S. PATENT DOCUMENTS 4,877,065 A * 10/1989 Lamboy .................... B65B 3/16 141/319
5,092,750 A * 3/1992 Leroy ..................... F04B 35/04 417/313
5,148,839 A * 9/1992 Kirwan ................... F17C 13/04 141/49
5,343,904 A * 9/1994 Kaeser .................. B65B 31/003 141/346
5,462,099 A * 10/1995 Demarest ............... B65D 83/42 200/518
5,845,682 A * 12/1998 Hayao .................. B41J 2/17506 141/2

(Continued)

FOREIGN PATENT DOCUMENTS

DE 102017106439 B3 * 5/2018 .............. F41A 33/06

*Primary Examiner* — Jason K Niesz

(74) *Attorney, Agent, or Firm* — Scott R. Zingerman; David G. Woodral; James F. Lea, III

(57) ABSTRACT

A gas magazine for a pneumatic weapon simulator. A gas magazine fill station for a pneumatic weapon simulator. A method of filling a gas magazine for a pneumatic weapon simulator. The apparatus for filling and refilling a fluid reservoir of a magazine for a pneumatic firearm simulator from a source of pressurized fluid of the present disclosure includes: a receiver for receiving the magazine; a passage for conveying the pressurized fluid from the source of pressurized fluid to the fluid reservoir of the magazine received in the receiver; and, a vent valve in fluid communication with the passage for venting the pressurized fluid from the passage. The apparatus may further include a vent channel in fluid communication with the vent valve. The apparatus may also include a valve in fluid communication with the passage which is adapted for permitting pressurized fluid to be conveyed through the passage; and alternately, prevent pressurized fluid from being conveyed through the passage.

19 Claims, 9 Drawing Sheets

(56) References Cited

U.S. PATENT DOCUMENTS

| | | | | |
|---|---|---|---|---|
| 7,708,035 | B2 * | 5/2010 | Windmiller | B67D 1/0456 220/709 |
| 7,992,599 | B2 * | 8/2011 | Iaconis | H01M 8/04201 141/237 |
| 2015/0090243 | A1 * | 4/2015 | Tseng | F41B 11/62 124/74 |

* cited by examiner

APPARATUS AND METHOD FOR FILLING A GAS MAGAZINE OF A PNEUMATIC WEAPON SIMULATOR

CROSS REFERENCE TO RELATED APPLICATION

This application claims the benefit of U.S. Provisional Application No. 62/986,596 entitled APPARATUS AND METHOD FOR FILLING A GAS MAGAZINE OF A PNEUMATIC WEAPON SIMULATOR filed Mar. 6, 2020, herein incorporated by reference in its entirety for all purposes.

FIELD OF THE INVENTION

This invention relates generally to converting an actual firearm to a firearm simulator and more particularly to a pneumatic firearm simulator.

BACKGROUND OF THE INVENTION

Firearms have been converted into firearm simulators by replacement of parts of the firearm with simulator parts for simulated shooting such that the resultant firearm comprises a combination of actual firearm components and simulated firearm components. The simulated firearm components have included a simulated barrel unit and a simulated magazine unit. The prior simulated magazine units have included a compressed gas container or a connection to an external compressed gas source. The compressed gas is used to provide energy to operate the weapon simulator by actuating valve means in the simulated barrel unit. The compressed gas is conducted from the compressed gas container, or the external compressed gas source to the simulated barrel unit. When actuated, the valve means forces movement of a slide and compression of a recoil spring and subsequent venting. The resulting recoil simulates the feel of actual weapon firing. A laser beam pulse means is responsive to the simulated weapon firing whereby the laser beam pulse means emits a laser beam onto a target. It would be advantageous to improve simulated weapon firing by providing a quick fill apparatus and method used to fill/refill gas magazines of pneumatic weapon simulator components.

SUMMARY OF THE INVENTION

The present disclosure includes an apparatus and method for filling (preferably rapidly) a pneumatic reservoir such as a magazine for a firearm simulator with a pressurized fluid such as compressed gas, $CO_2$, nitrogen, air, or a mixture of these, without limitation. In a preferred arrangement, the fill apparatus of the present disclosure will fill a magazine reservoir in approximately five (5) seconds or less.

Such firearm simulators commonly employ a combination of actual firearm components and simulated firearm components to achieve an effective training weapon which does not require live ammunition. Certain original parts may be removed from the actual weapon and substituted with pneumatic components. In this way, the resulting firearm simulates the aiming and firing (recoil) of the actual firearm. Using a pressurized fluid such as compressed gas instead of live ammunition provides the opportunity to fire a large number of simulated rounds at a negligible cost.

The apparatus for filling and refilling a fluid reservoir of a magazine for a pneumatic firearm simulator from a source of pressurized fluid of the present disclosure includes, generally: a receiver for receiving the magazine; a passage for conveying the pressurized fluid from the source of pressurized fluid to the fluid reservoir of the magazine received in the receiver; and, a vent valve in fluid communication with the passage for venting the pressurized fluid from the passage. The apparatus may include a block such that the receiver is a part of the block. The apparatus may further include a vent channel in fluid communication with the vent valve.

The apparatus may also include a valve in fluid communication with the passage which is adapted for permitting pressurized fluid to be conveyed through the passage; and alternately, prevent pressurized fluid from being conveyed through the passage. The apparatus also, preferably includes means for actuating this pressure valve and/or the vent valve. This means could be a lever, a rotary actuator, a push button actuator, and/or a slide actuator, without limitation.

In an alternate embodiment, the vent valve may be a single valve that serves both pressure valve functions and vent valve functions. This valve may be a three position valve adapted to permit pressurized fluid to be conveyed through the passage; prevent pressurized from being conveyed through the passage; and, vent pressurized fluid from the passage. This single valve may also include means for actuating the valve such as a lever, a rotary actuator, a push button actuator, and/or a slide actuator, without limitation.

A yoke may be used to mount the block to a portable source for pressurized fluid, such as a scuba tank, for example. Otherwise, if not yoke then a pressure hose or tubing could connect the source of pressurized fluid to the block.

The apparatus of the present disclosure may further include an interface between the fluid reservoir and the passage and means for sealing the interface. The means for sealing the interface may include an o-ring positioned in the receiver at the interface.

A wiper may be positioned in the receiver. The wiper is preferably adapted for removing debris from the magazine as the magazine is inserted in the receiver.

The apparatus in an alternate embodiment may include a plurality of receivers, wherein of the plurality of receivers is adapted to receive a magazine, each magazine including a fluid reservoir. The passage being in fluid communication with each of the plurality of reservoirs. There is preferably an interface between each of the plurality of receivers between each fluid reservoir and passage. At least one of said plurality of receivers includes a check valve at said interface.

In another aspect of the present disclosure includes a magazine for a pneumatic firearm simulator for simulated shooting. The magazine preferably includes a fluid reservoir; a housing for enclosing the fluid reservoir, wherein the housing includes a valve in fluid communication with the fluid reservoir; and, the valve is adapted for permitting a pressurized fluid to enter the reservoir but prevented from exiting the fluid reservoir. The valve may include a filter adapted to filter the pressurized fluid permitted to enter the reservoir. The valve may be of any suitable construction, such as, for example, a needle valve.

A method of filling and refilling a fluid reservoir of a magazine for a pneumatic firearm simulator from a source of pressurized fluid is also contained in the present disclosure. The method including: inserting the magazine into a receiver; conveying the pressurized fluid through a passage from the source of pressurized fluid to the fluid reservoir of the magazine in the receiver; and, venting the pressurized fluid from the passage via a vent valve in fluid communication with the passage.

The method of claim 18 further including a valve in fluid communication with said passage adapted for permitting pressurized fluid to be conveyed through said passage; and, prevent pressurized fluid from being conveyed through said passage, said method further including actuating said valve to either permit pressurized fluid to be conveyed through said passage or, alternatively, prevent pressurized fluid from being conveyed through said passage.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DESCRIPTION OF THE INVENTION

A gas magazine for a pneumatic weapon simulator and fill station therefore of the present disclosure is set forth in FIGS. 1-10. Also set forth is a method for filling a gas magazine for a pneumatic weapon simulator.

Figure 1B:
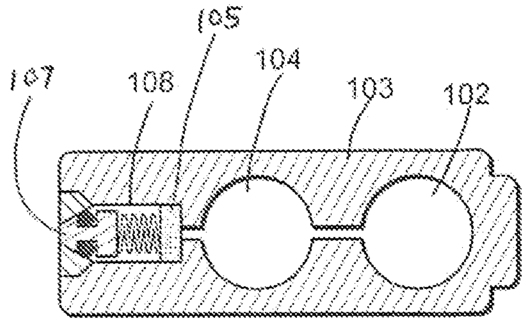
FIG. 1B is a view taken along lines 1B-1B of FIG. 1A and depicts a cutaway view of one embodiment of a magazine fill port and fill valve.
Figure 1A:
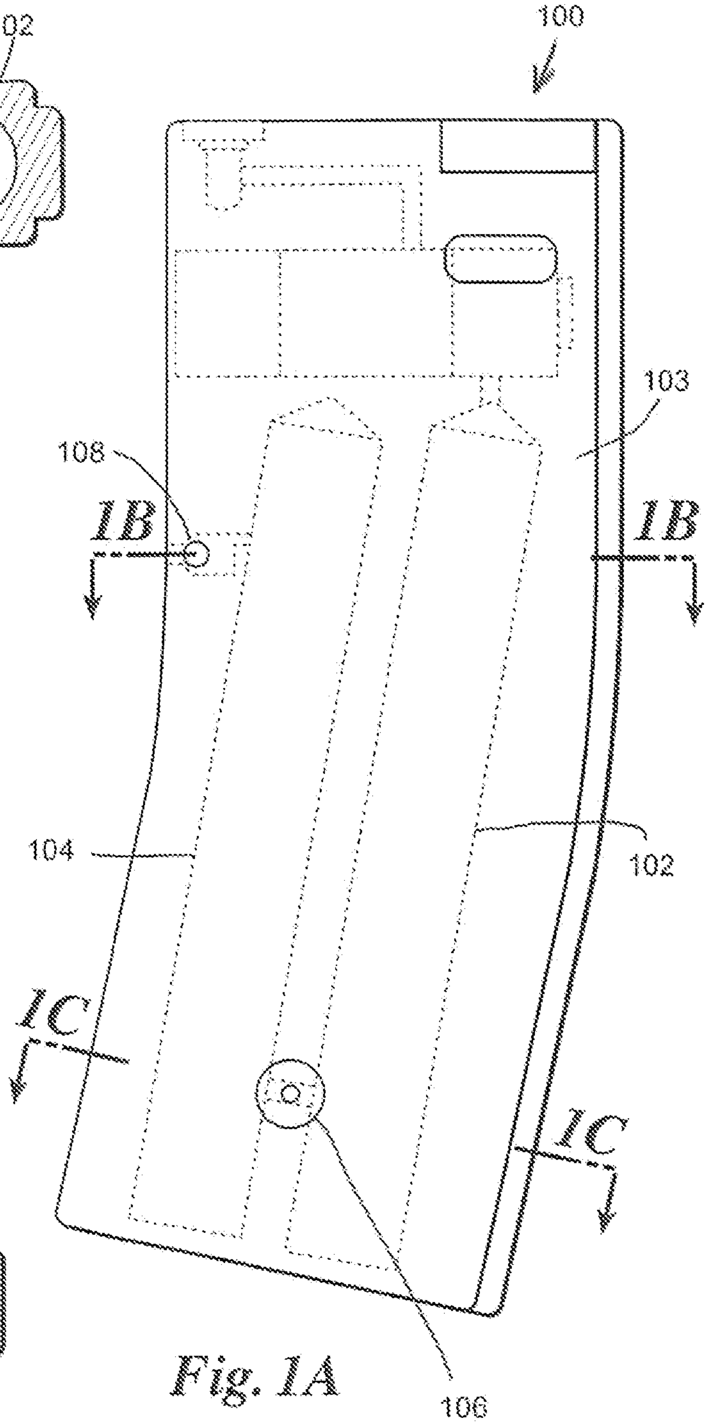
FIG. 1A depicts a side view of a compressed gas magazine for a pneumatic weapon simulator showing two compressed gas reservoirs in phantom as well as a fill port and alternate embodiment fill port.
Figure 1C:
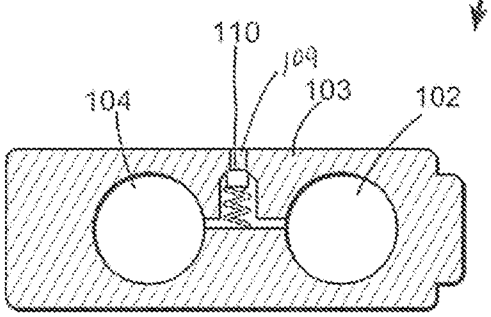
FIG. 1C is a view taken along lines 1C-1C of FIG. 1A and depicts a cutaway view of an alternate embodiment of a magazine fill port and fill valve.
Figure 2:
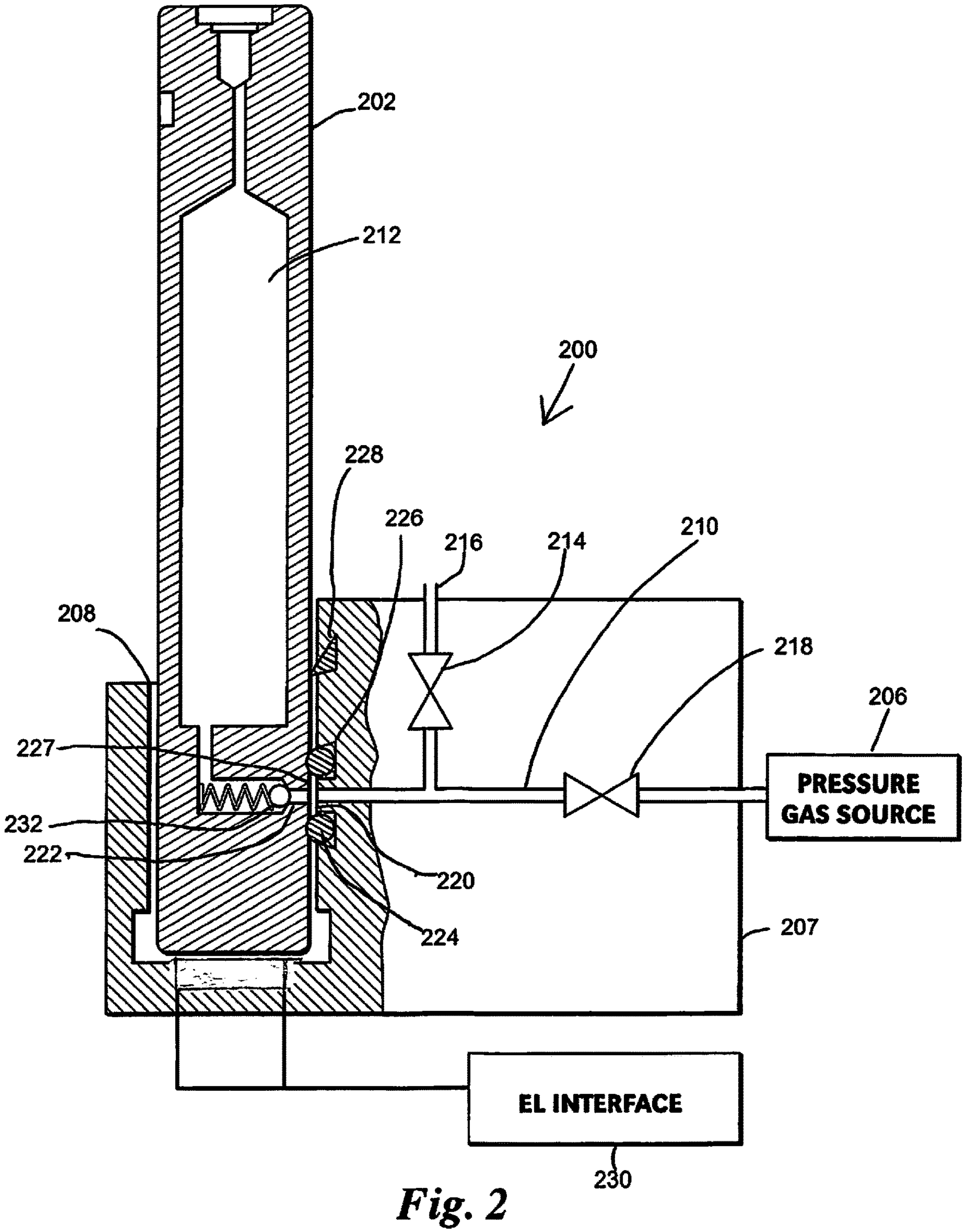
FIG. 2 depicts a cut-away side view of the compressed gas magazine of FIG. 1 inserted in a fill station according to the present disclosure.

First with reference to FIG. 2 which depicts a cut-away side view of the compressed gas magazine of FIG. 1 inserted in a fill station according to the present disclosure. The apparatus 200 for filling and refilling a fluid reservoir 212 of a magazine 202 for a pneumatic firearm simulator from a source of pressurized fluid 206 of the present disclosure includes, in a basic embodiment, a receiver 208 for receiving magazine 202; a passage 210 for conveying pressurized fluid from source of pressurized fluid 206 to a fluid reservoir 212 (of the magazine 202 received in receiver 208); and, a vent valve 214 in fluid communication with passage 210 for venting pressurized fluid from passage 210. In the preferred embodiment, receiver 208 is a cavity integral with a block 207 Apparatus 200 may further include a vent channel 216 in fluid communication with vent valve 214. Magazine 202 is embodied in FIG. 2 as a pneumatic magazine for a rifle simulated firearm but could be configured as a magazine for a different firearm.

The apparatus 200 in a preferred embodiment also includes a passage valve 218 in fluid communication with passage 210. Passage valve 218 is adapted to be positioned in an open position permitting pressurized fluid (compressed gas) to be conveyed through passage 210; and alternately, positioned in a closed position to prevent pressurized fluid from being conveyed through passage 210 to magazine 202 inserted in receiver 208. Apparatus 200 also, preferably, includes means for actuating passage valve 218 and/or vent valve 214. This means could be a lever (609 of FIG. 6, 709 of FIG. 7, and/or 809 of FIG. 8C), a rotary actuator (509 of FIG. 5), a push button actuator, and/or a slide actuator (409 of FIG. 4 in conjunction with lever 411). It should be understood, however that these are non-limiting examples of contemplated actuators.

Apparatus 200 further includes an interface 220 between fill passage 222 (leading into fluid reservoir 212 from a fill port 227) and passage 210. There is also a means for sealing interface 220 to prevent the escape of pressurized fluid. The means for sealing interface 220 is an o-ring 224 in a channel 226 O-ring 224 is positioned and preferably extends into receiver 208 so as to retain magazine 202 in receiver 208 and seal interface 220. A wiper 228 is positioned in receiver 208. Wiper 228 is preferably adapted for removing debris from magazine 202 as magazine 202 is inserted into receiver 208.

Ball valve 232 is opened by fluid pressure from pressure gas source 206 (as permitted through valve 218) entering fill passage 222 through sealing interface 220 and closes to prevent the escape of fluid from fluid reservoir 212 when magazine 202 is removed from apparatus 200.

Each receiver 208 may include an electronic interface 230 adapted to mate an electronic interface (such as 1002 of magazine 1000 of FIG. 10) on the magazine. Electronic interface 230 may serve at least one of three functions, without limitation. Electronic interface 230 may serve to charge electric batteries which may be included on magazine 202. These batteries could be used to power any number of accessories for the simulated firearm such as a scope, laser to name just two examples. Electronic interface 230 may serve to reset a shot counter that may be included on magazine 202. Such shot counters are useful to determine performance and/or to indicate an “empty” simulated magazine. Finally, electronic interface 230 could be used to actuate the apparatus 200 such as if valves 214 and/or 218 were electronically/electrically actuated.

Figure 3:
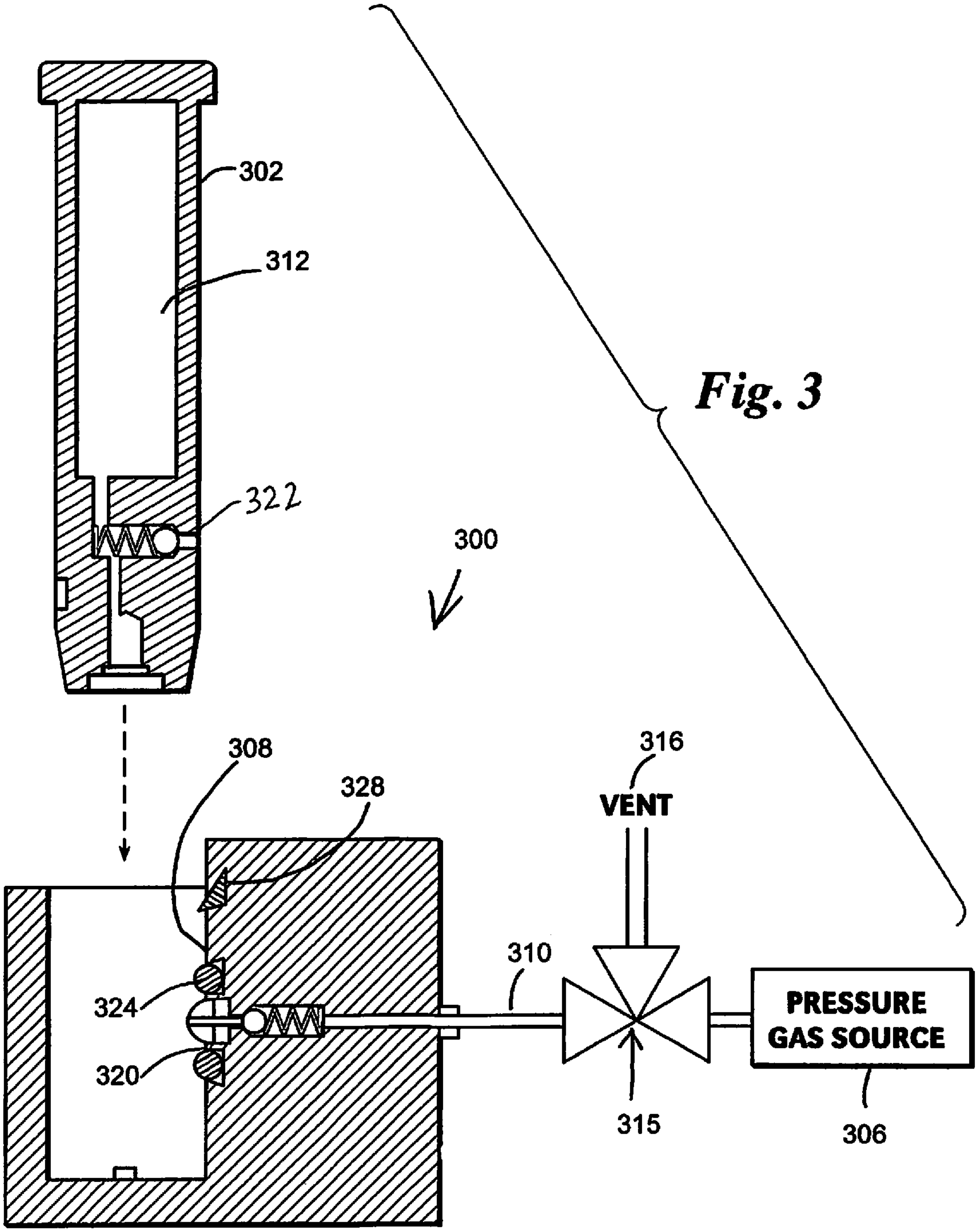
FIG. 3 depicts a cut-away side view of a compressed gas magazine separated from an embodiment of a fill station of the present disclosure and a schematic representation of an embodiment of a method of refilling a compressed gas magazine of a pneumatic weapon simulator.

FIG. 3 depicts a cut-away side view of a compressed gas magazine 302 separated from an embodiment of a fill station 300 of the present disclosure and a schematic representation of an embodiment of a method of refilling a compressed gas magazine of a pneumatic weapon simulator. In this alternate embodiment 300, the vent valve 315 may be a single valve that serves both pressure valve functions and vent valve functions. This valve 315 may be a three position valve adapted to permit pressurized fluid to be conveyed through the passage from gas source 306; prevent pressurized fluid from being conveyed through the passage; and, vent pressurized fluid from the passage through vent 316. This single valve 315 may also include means for actuating the valve such as a lever, a rotary actuator, a push button actuator, and/or a slide actuator, without limitation. Fill station 300 further includes a receiver 308 including an interface 320 between fill passage 322 (leading into fluid reservoir 312) and passage 310. There is also a means for sealing interface 320 to prevent the escape of pressurized fluid. The means for sealing interface 320 is an o-ring 324 in a channel in receiver 308. O-ring 324 is positioned and preferably extends into receiver 308 so as to retain magazine 302 in receiver 308 and seal interface 320. A wiper 328 is positioned in receiver 308. Wiper 328 is preferably adapted for removing debris from magazine 302 as magazine 302 is inserted into receiver 308.

Figure 4:
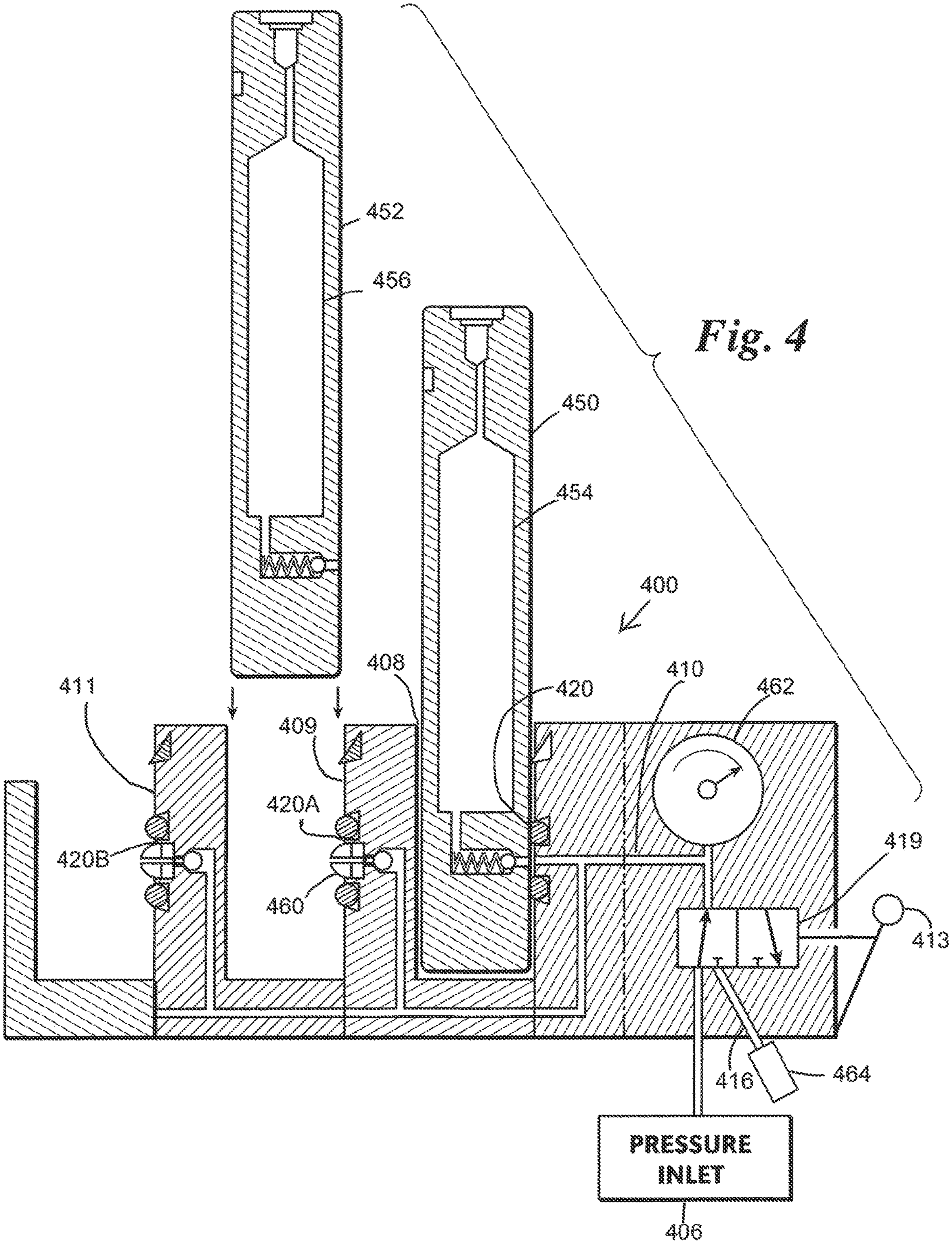
FIG. 4 is a schematic cut-away side view of an alternate embodiment compressed gas magazine fill station and method of the present disclosure capable of receiving and filling multiple compressed gas magazines.

FIG. 4 is a schematic cut-away side view of an alternate embodiment 400 compressed gas magazine fill station and method of the present disclosure capable of receiving and filling multiple compressed gas magazines 450 and 452.

The apparatus in alternate embodiment 400 may include a plurality of receivers 408, 409, and 411. Each of the plurality of receivers 408, 409, and 411 is adapted to receive a magazine (450 and 452), each magazine including a fluid reservoir (454 and 456 respectively). The passage 410 being in fluid communication with each of the plurality of reservoirs 408, 409, and 411. There is preferably an interface 420, 420A, 420B, and 420C, between each of the plurality of receivers 408, 409, and 411 between each fluid reservoir 454 and 456 (receiver 411 being depicted empty) and passage 410. At least one of said plurality of receivers includes a check valve 460 at interface 420A. In this alternate embodiment 400, a vent valve 419 may be a single valve that serves both pressure valve functions and vent valve functions. This valve 415 may be a three position valve adapted to permit pressurized fluid to be conveyed through the passage from a gas source through pressure inlet 406; prevent pressurized fluid from being conveyed through the passage; and, vent pressurized fluid from the passage through passage 416 to vent 464. This single valve 419 may also include means for actuating the valve such as a lever 413, a rotary actuator, a push button actuator, and/or a slide actuator, without limitation. A pressure gauge 462 may provide a reading of fluid pressure in passage 410.

FIG. 1A depicts a side view of a compressed gas magazine 100 for a pneumatic weapon simulator showing two compressed gas reservoirs 102 and 104 in phantom as well as two alternate embodiment fill port valves/port placements 106 and 108. Gas magazine 100 is contemplated to be used (filled/refilled) in conjunction with the fill/refill apparatus of the present disclosure. A housing 102 encloses gas reservoirs 102 and 104. Each fill port valve 106 and 108 is adapted for permitting pressurized fluid to enter reservoirs 102 and 104 but preventing pressurized fluid from exiting fluid reservoirs 102 and 104. FIGS. 1A-1C depict another aspect of the present disclosure. FIG. 1B is a view taken along lines 1B-1B of FIG. 1A and depicts a cutaway view of one embodiment 103 of a magazine fill port 108 and fill valve 107.

FIG. 1C is a view taken along lines 1C-1C of FIG. 1A and depicts a cutaway view of an alternate embodiment 103 of a magazine fill port 109 and fill valve 110.

The valve may include a filter (105 of FIG. 1B) adapted to filter the pressurized fluid permitted to enter the reservoir. The valve may be of any suitable construction, such as, for example, a needle valve (107 of FIG. 1B).

Figure 5:
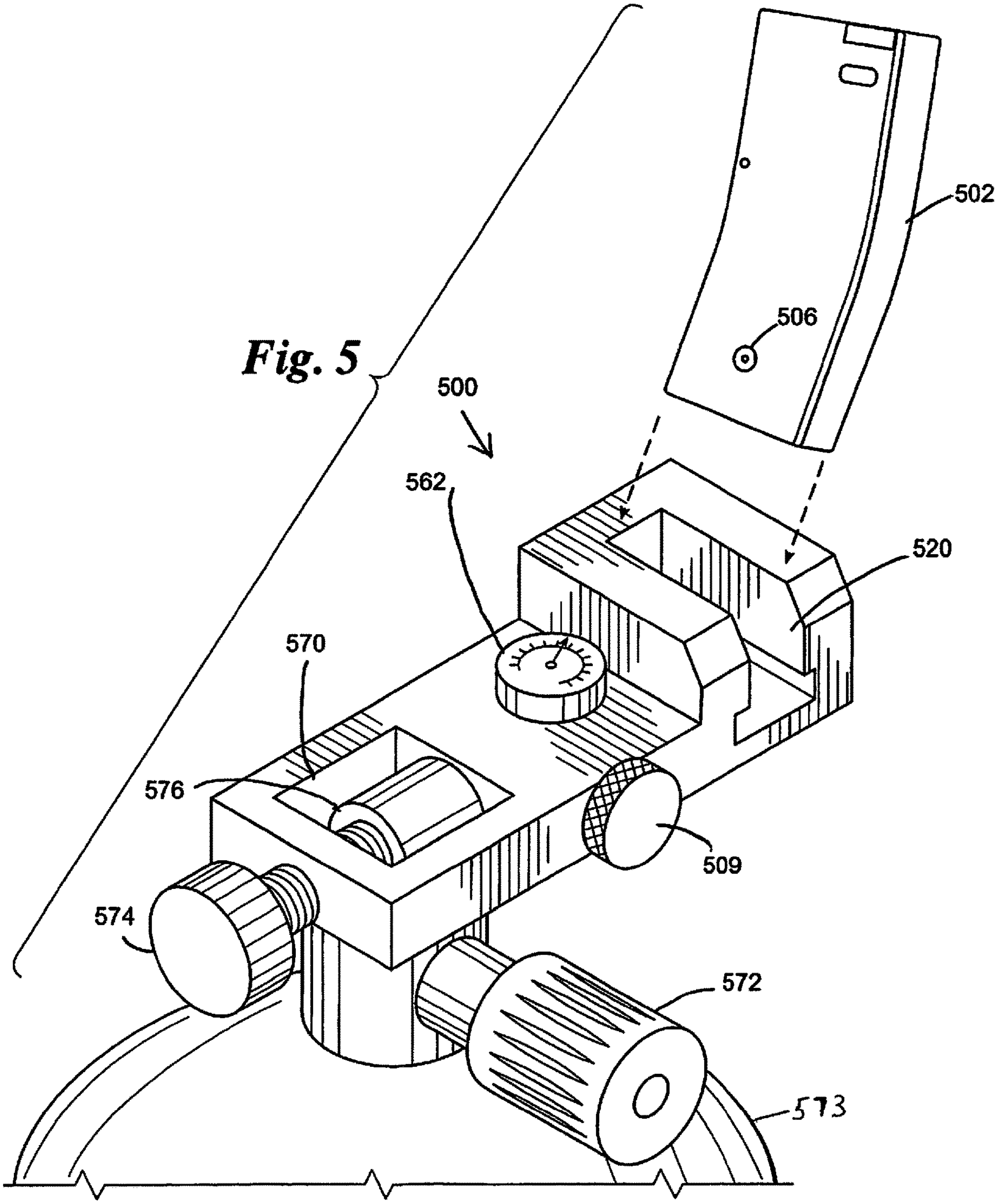
FIG. 5 is an isometric view of a field unit single magazine fill station and method of filling a compressed gas magazine of the present disclosure.

FIG. 5 is an isometric view of a basic embodiment field unit single magazine fill station 500 for filling a compressed gas magazine 502 having a fill port 506 of the present disclosure. A yoke 574, 576 may be used to mount the block 570 to a portable source for pressurized fluid, such as a scuba tank 573, for example. Otherwise, if not yoke 570 then a pressure hose or tubing (680 of FIG. 6 or 780 of FIG. 7) could connect the source 573 of pressurized fluid to the block 570. A knob 572 provides general flow of fluid from tank 573 as a course adjustment while knob 509 further controls the flow of fluid for a fine adjustment. A pressure gauge 562 measures the pressure of fluid flow into magazine 502 inserted in slot 520.

Figure 6:
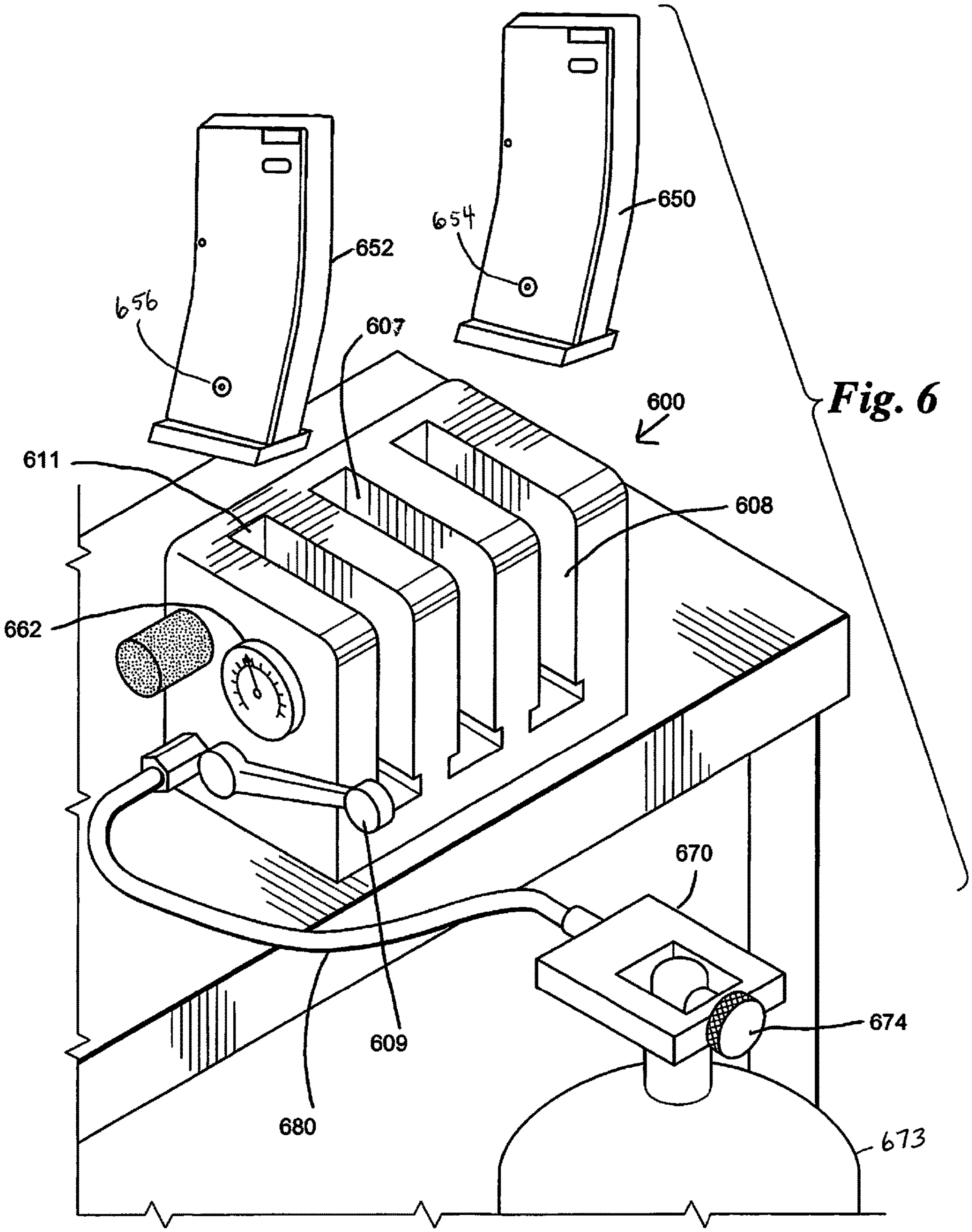
FIG. 6 is an isometric view of a bench unit multi-magazine fill station and method of filling a compressed gas magazine of the present disclosure.

FIG. 6 is an isometric view of a bench unit 600 multi-magazine fill station and method of filling a compressed gas magazine of the present disclosure. A block 670 is mounted to a source of pressurized fluid 673. Fluid flow is controlled by a valve 674 from block 670 through a pressure line or passage 680 to multi magazine fill station 600. Multi magazine fill station 600 includes a plurality of slots 607, 608, and 611 for receiving magazines 650 and 652 each having a fill port 654 and 656, respectively. A valve controlled by lever 609 allows flow of pressurized fluid into magazines 650 and 652 when seated in slots 508 and 611, respectively. A pressure gauge 662 measure the pressure of fluid flow.

Figure 7:
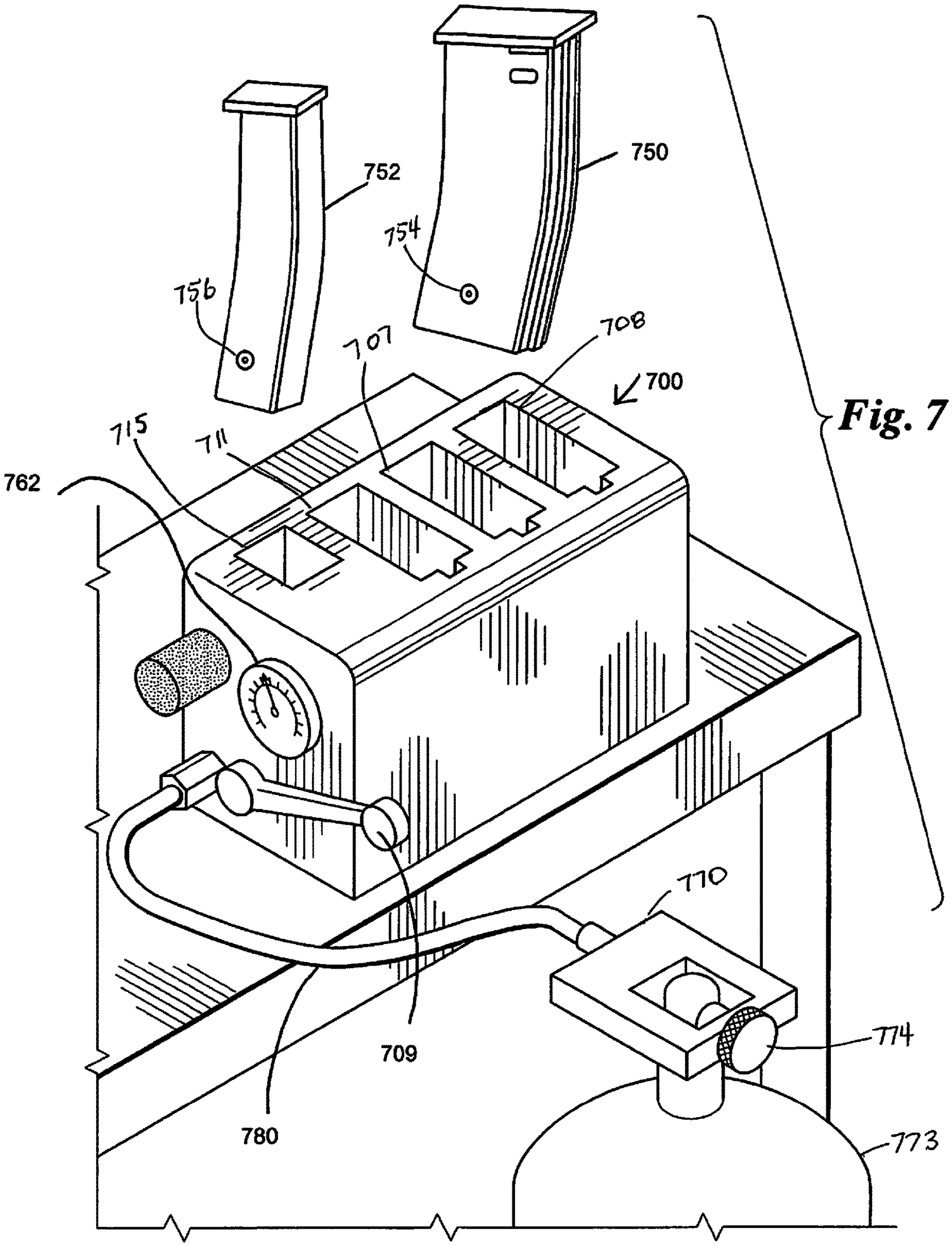
FIG. 7 is an alternate embodiment isometric view of a bench unit multi-magazine fill station and method of filling a compressed gas magazine of the present disclosure.

FIG. 7 is an alternate embodiment isometric view of a bench unitb 700 multi-magazine fill station and method of filling a compressed gas magazine of the present disclosure. A block 770 is mounted to a source of pressurized fluid 773. Fluid flow is controlled by a valve 774 from block 770 through a pressure line or passage 780 to multi magazine fill station 700. Multi magazine fill station 700 includes a plurality of slots 707, 708, and 711 for receiving magazines such as magazine 750 and may include an additional slot 715 to receive a magazine 752 for a different caliber/type of weapon. Magazines 750 and 752 each having a fill port 754 and 756, respectively. A valve controlled by lever 709 allows flow of pressurized fluid into magazines 750 and 752 when seated in slots 708 and 715, respectively. A pressure gauge 762 measure the pressure of fluid flow.

Figure 8A:
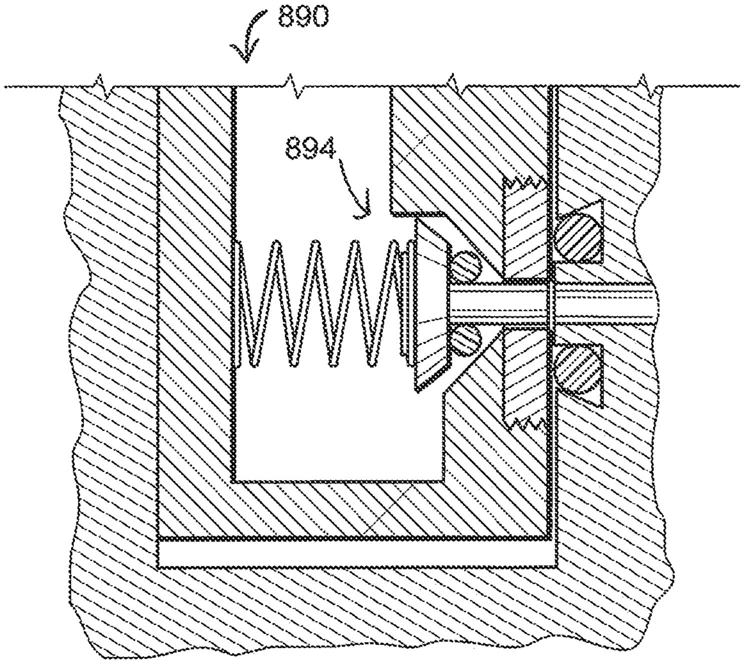
FIG. 8A is a cut-away view of a compressed gas magazine of a pneumatic weapon simulator inserted in a fill station depicting an alternate embodiment fill port and fill valve of the magazine mating the fill port of the fill station according to the preset disclosure. An isometric view of a magazine fill port and views of fill stations are also depicted.

FIG. 8A is a cut-away view of a compressed gas magazine 890 of a pneumatic weapon simulator inserted in a fill station depicting an alternate embodiment fill port and fill valve 894 of the magazine mating the fill port of the fill station according to the preset disclosure. An isometric view of a magazine fill port and views of fill stations are also depicted.

Figure 8B:
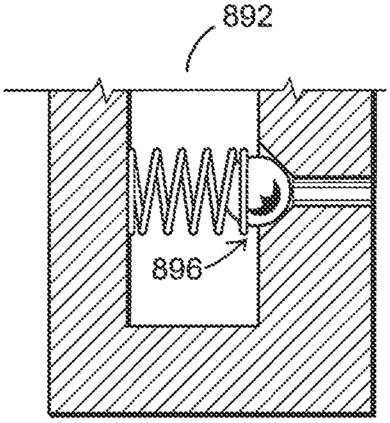
FIG. 8B is a cutaway partial vies of an alternate embodiment compressed gas magazine of a pneumatic firearm simulator depicting an alternate embodiment fill port and fill valve.

FIG. 8B is a cutaway partial vies of an alternate embodiment compressed gas magazine 892 of a pneumatic firearm simulator depicting an alternate embodiment fill port and fill valve 896.

Figure 8C:
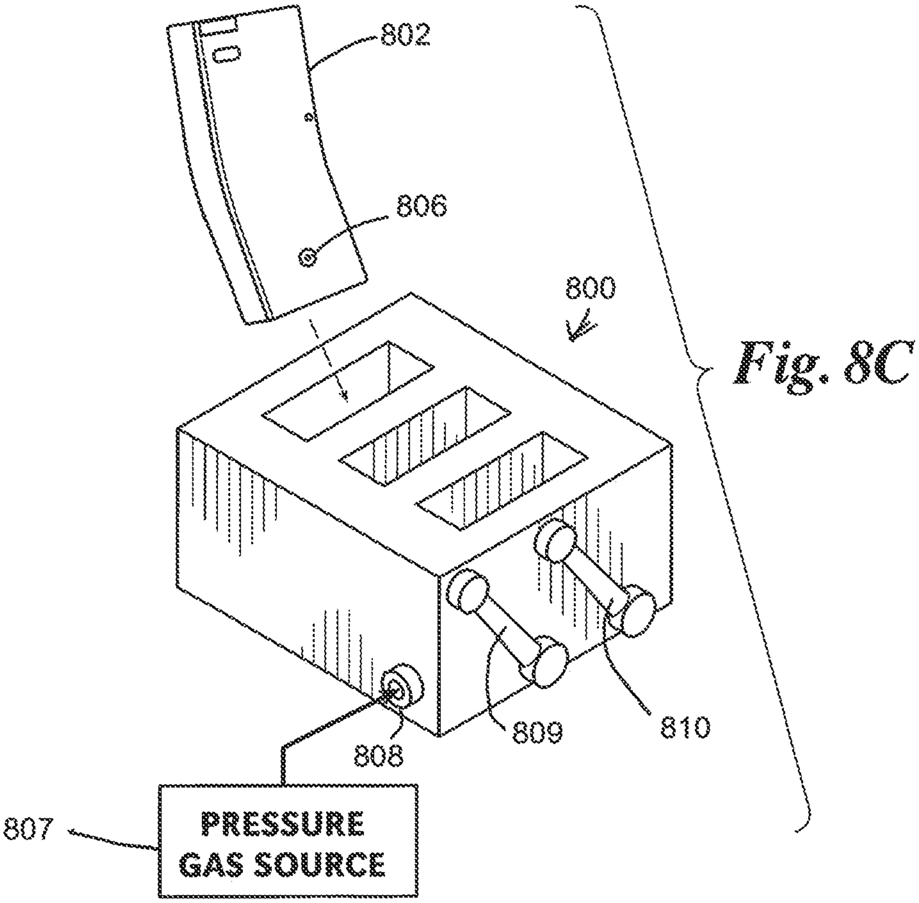
FIG. 8C is an isometric view of an embodiment of a multi-bay magazine fill station of the present disclosure and particularly depicting the port for connection to a pressure fluid/gas source/supply and fill and bleed levers.

FIG. 8C is an isometric view of an embodiment 800 of a multi-bay magazine fill station of the present disclosure and particularly depicting the port for connection to a pressure fluid/gas source/supply and fill and bleed levers. A source of pressurized fluid 807 provides fluid to a port 808 through a pressure line or passage to multi magazine fill station 800. Multi magazine fill station 800 includes a plurality of slots for receiving magazines such as magazine 802 having a fill port 706. A valve controlled by lever 809 allows flow of pressurized fluid into magazine 802 when seated in a slot. A pressure gauge 762 measure the pressure of fluid flow. A bleed lever 810 allows fluid to be bled from the system to facilitate removal of magazine 802 from its slot.

Figure 9:
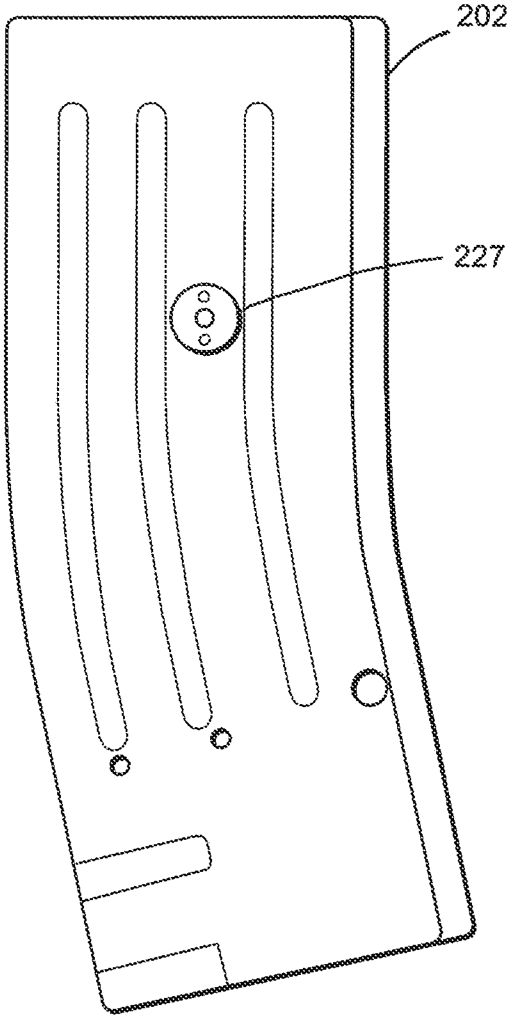
FIG. 9 is a side view of a gas magazine of a pneumatic weapons simulator depicting a side fill port of the present disclosure.

FIG. 9 is a side view of a gas magazine of a pneumatic weapons simulator depicting a side fill port of the present disclosure.

Figure 10:
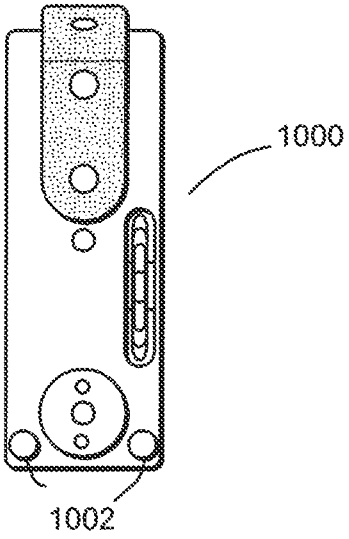
FIG. 10 is a top view of an alternate embodiment gas magazine of a pneumatic weapon simulator depicting a supply port for a firearm simulator.

FIG. 10 is a top view of an alternate embodiment gas magazine of a pneumatic weapon simulator depicting a supply port for a firearm simulator.

A method of filling and refilling a fluid reservoir of a magazine for a pneumatic firearm simulator from a source of pressurized fluid is also contained in the present disclosure. The method including: inserting the magazine into a receiver; conveying the pressurized fluid through a passage from the source of pressurized fluid to the fluid reservoir of the magazine in the receiver; and, venting the pressurized fluid from the passage via a vent valve in fluid communication with the passage.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. An apparatus for an pneumatic firearm simulator for filling and refilling a fluid reservoir of a magazine through its fill from a source of pressurized fluid, the apparatus comprising:

a receiver adapted for receiving the magazine inserted therein;

said receiver including a seal;

said receiver including a non-sealed enabler;

said seal adapted to surround said enabler and the fill port when the magazine is inserted in said receiver;

a passage for conveying the pressurized fluid from the source of pressurized fluid to the fluid reservoir of the magazine received in said receiver past said enabler and through the fill port.

2. The apparatus of claim 1 further including a wiper positioned in said receiver adapted for removing debris from said magazine.

3. The apparatus of claim 1 including a plurality of receivers, each of said plurality of said receivers adapted to receive a magazine, each magazine including a fluid reservoir; said passage being in fluid communication with each of said plurality of reservoirs.

4. The apparatus of claim 3 wherein at least one of said plurality of receivers includes a check valve at said interface.

5. The apparatus of claim 1 wherein said receiver includes an electronic interface adapted to mate with an electronic interface on said magazine.

6. The apparatus of claim 1 wherein the magazine includes a shot counter and said receiver includes a boss adapted to reset said shot counter when the magazine is inserted in said receiver.

7. The apparatus of claim 1 further including a valve in fluid communication with said passage adapted for permitting pressurized fluid to be conveyed through said passage; and, prevent pressurized fluid from being conveyed through said passage.

8. The apparatus of claim 7 including means for actuating said valve.

9. The apparatus of claim 1 further including a vent valve in fluid communication with said passage for venting the pressurized fluid from said passage and a vent channel in fluid communication with said vent valve.

10. The apparatus of claim 9 wherein said vent valve is a three position valve adapted to permit pressurized fluid to be conveyed through said passage; prevent pressurized fluid from being conveyed through said passage; and, vent pressurized fluid from said passage.

11. The apparatus of claim 10 including means for actuating said valve.

12. The apparatus of claim 1 including a block such that said receiver is a part of said block.

13. The apparatus of claim 12 wherein said block includes a first receiver in fluid communication with said passage;

said block including a first check valve;

an end section secured to said block;

said block and said end section defining a second receiver such that said first check valve is positioned in said second receiver.

14. The apparatus of claim 13 including a middle section positioned between said block and said end section;

said middle section secured to said block;

said end section secured to said middle section;

said block and said middle section defining a third receiver such that said first check valve is positioned in said third receiver;

said end section secured to said middle section such that said middle section and said end section define said second receiver;

said middle section including a second check valve;

said second check valve positioned in said second receiver.

15. A magazine for a pneumatic firearm simulator for simulated shooting, said magazine comprising:

a fluid reservoir;

a housing for enclosing said fluid reservoir;

said housing including a valve in fluid communication with said fluid reservoir;

said valve adapted for permitting a pressurized fluid to enter said reservoir but preventing said pressurized fluid from exiting said fluid reservoir;

said valve including a filter adapted to filter said pressurized fluid permitted to enter said reservoir.

16. The magazine of claim 15 wherein said valve is a needle valve.

17. An apparatus for an pneumatic firearm simulator for filling and refilling a fluid reservoir of a magazine through its fill port from a source of pressurized fluid, the apparatus comprising:

a receiver adapted for receiving the magazine inserted therein;

said receiver including a check valve;

said receiver including a seal surrounding said check valve;

said seal adapted to surround the fill port when the magazine is inserted in said receiver;

said check valve including an interface adapted for contact with the fill port of the magazine when inserted in said receiver;

a passage for conveying the pressurized fluid from the source of pressurized fluid to the fluid reservoir of the magazine received in said receiver;

said passage terminating at said check valve;

said interface shaped so as to allow the magazine to be freely inserted in said receiver past said interface.

18. The apparatus of claim 17 wherein said interface includes a domed shape.

19. The apparatus of claim 17 wherein said interface includes a domed shape.

* * * * *